United States Patent
Takewaki et al.

(10) Patent No.: US 10,189,551 B2
(45) Date of Patent: Jan. 29, 2019

(54) DISPLAY CONTROLLER

(71) Applicant: SUZUKI MOTOR CORPORATION, Hamamatsu-shi, Shizuoka (JP)

(72) Inventors: Hiromichi Takewaki, Hamamatsu (JP); Toshiya Kataoka, Hamamatsu (JP); Yuki Nakaaki, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 15/873,711

(22) Filed: Jan. 17, 2018

(65) Prior Publication Data

US 2018/0215455 A1    Aug. 2, 2018

(30) Foreign Application Priority Data

Jan. 27, 2017   (JP) ................................. 2017-012752

(51) Int. Cl.

| | |
|---|---|
| B63H 20/14 | (2006.01) |
| B63H 21/21 | (2006.01) |
| B63H 20/12 | (2006.01) |
| F02B 61/04 | (2006.01) |
| B60R 16/02 | (2006.01) |
| B63H 25/02 | (2006.01) |

(Continued)

(52) U.S. Cl.
CPC ............. *B63H 20/14* (2013.01); *B60K 35/00* (2013.01); *B60R 16/02* (2013.01); *B63H 20/12* (2013.01); *B63H 21/213* (2013.01); *B63H 25/02* (2013.01); *F02B 61/045* (2013.01); *B63H 2020/003* (2013.01)

(58) Field of Classification Search
CPC ......... B63H 25/42; B63H 20/14; G01D 7/002
See application file for complete search history.

(56) References Cited

U.S. PATENT DOCUMENTS

| | | | |
|---|---|---|---|
| 2006/0054067 A1* | 3/2006 | Hoberman | B63H 25/44 114/145 R |
| 2008/0233812 A1* | 9/2008 | Kawanishi | B63H 20/10 440/1 |
| 2013/0173138 A1* | 7/2013 | Vasichek | F02D 41/2422 701/102 |

FOREIGN PATENT DOCUMENTS

JP      4670515 B2    4/2011

* cited by examiner

*Primary Examiner* — Stephen P Avila
(74) *Attorney, Agent, or Firm* — Troutman Sanders LLP

(57) ABSTRACT

To display a multidimensional code representing unique information of an outboard motor, a display device ensures switchably displaying the multidimensional code representing identical information by a plurality of display patterns where ease of reading is mutually different. A multidimensional code creating unit converts the unique information of the outboard motor into the multidimensional code and creates the multidimensional codes by two patterns. That is, a first multidimensional code creating unit creates a multidimensional code for a display pattern that represents the unique information of the outboard motor by the predetermined count of N (one or plural) multidimensional codes. A second multidimensional code creating unit creates a multidimensional code for a display pattern that represents the unique information of the outboard motor by the multidimensional code by reducing an information volume represented by one multidimensional code and increasing the count of multidimensional codes more than the predetermined count N.

6 Claims, 4 Drawing Sheets

(51) Int. Cl.
*B60K 35/00* (2006.01)
*B63H 20/00* (2006.01)

F I G. 1
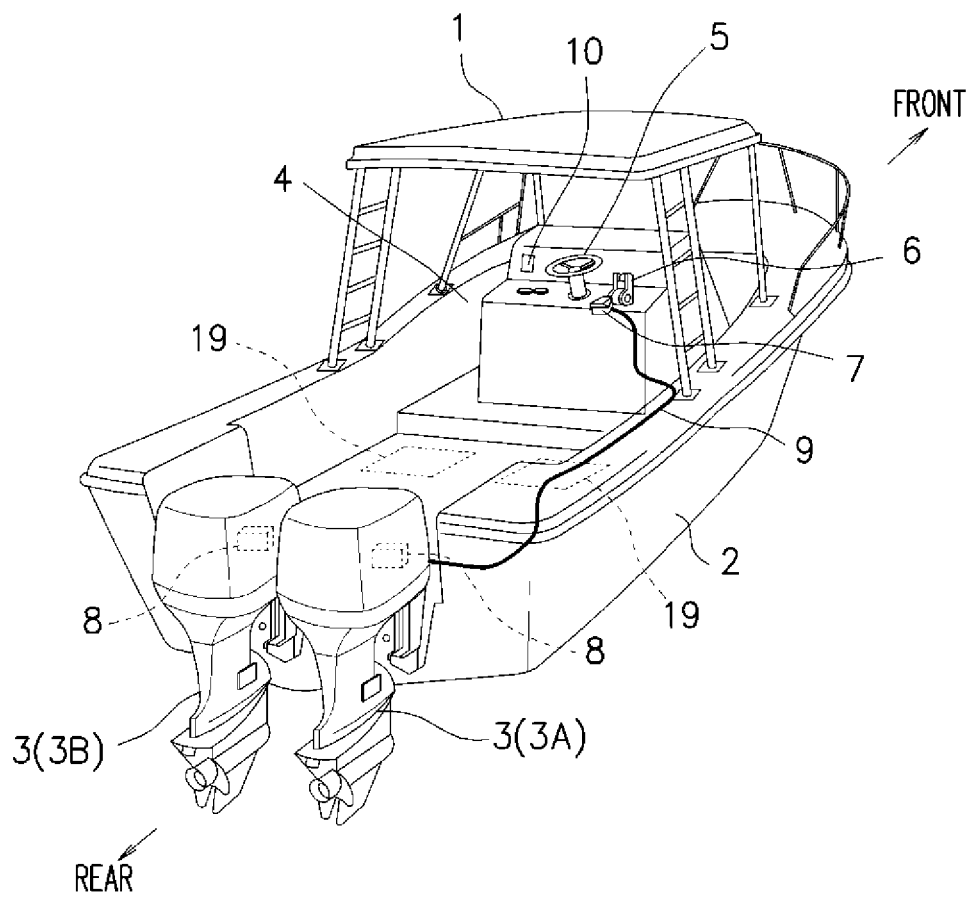

F I G. 2
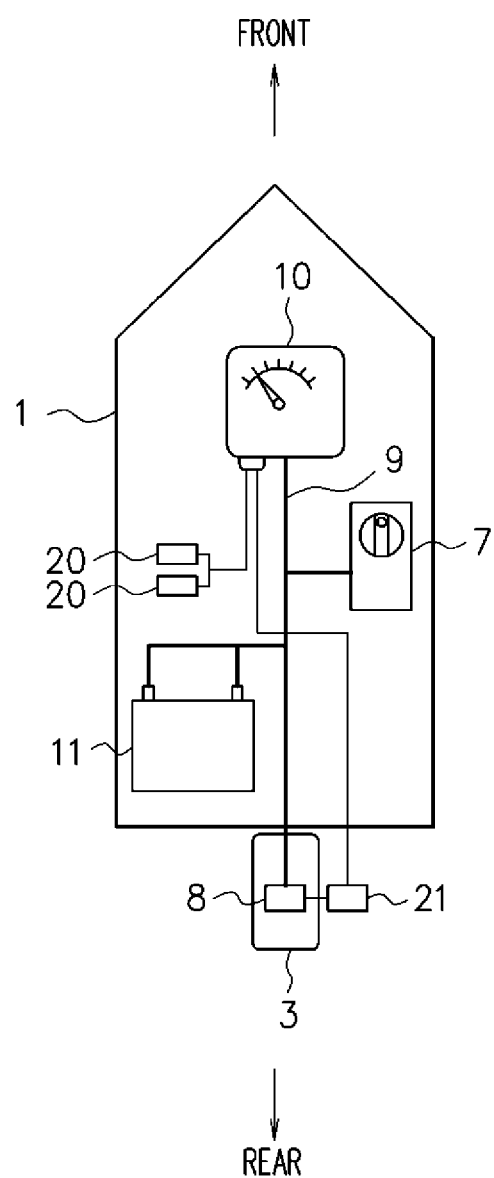

F I G. 5
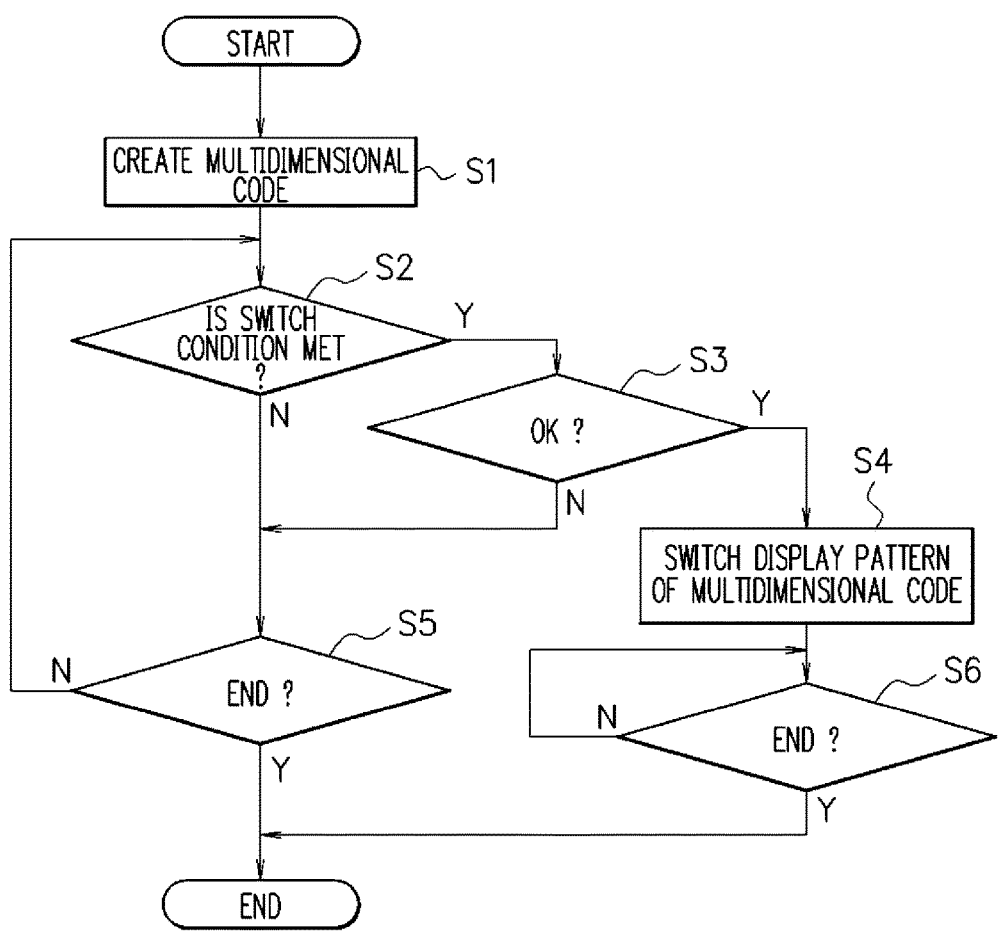

DISPLAY CONTROLLER

CROSS-REFERENCE TO RELATED APPLICATIONS

This application is based upon and claims the benefit of priority of the prior Japanese Patent Application No. 2017-012752, filed on Jan. 27, 2017, the entire contents of which are incorporated herein by reference.

FIELD OF THE INVENTION

The present invention relates to a display controller that displays a multidimensional code representing information on an outboard motor mounted to a boat or information on a vehicle in a display device.

BACKGROUND

For example, Japanese Patent No. 4670515 discloses a vehicle information recognition system that creates a multidimensional barcode representing unique information of a fork-lift (information for maintenance, inspection, or repair of a vehicle) and displays the information on a display device. The use of a mobile terminal including a multidimensional barcode reader allows extracting the unique information of the fork-lift by the multidimensional barcode displayed in the display device.

Thus, representing the information on the vehicle by the multidimensional code facilitates information exchange and improves a convenience.

However, depending on an environment such as a weather condition where the display device is placed, the multidimensional code displayed in the display device is difficult to be read in some cases. For example, it is possible to represent information on an outboard motor mounted to the boat by the multidimensional code. However, when the multidimensional code is displayed in the display device on the boat floating on the water, the multidimensional code becomes difficult to be read by an influence such as direct sunlight and a reflected light from a water surface.

Additionally, reading performance of the multidimensional code differs depending on the kind of the multidimensional code reader, and this makes it difficult to read the multidimensional code displayed in the display device in some cases.

Meanwhile, creating the multidimensional codes by dividing plurally allows reducing an information volume represented by each of the multidimensional codes, facilitating the reading of the multidimensional codes.

However, the count of repetitions of a reading operation increases as the count of multidimensional codes increases. Therefore, when the multidimensional codes are divided more than necessary, the reading of the multidimensional codes takes extra labor.

SUMMARY

The present invention has been made in consideration of such circumstances, and the object is to allow appropriately displaying a multidimensional code according to circumstances of the moment.

A display controller according to the present invention displays a multidimensional code in a display device. The multidimensional code represents information on an outboard motor mounted to a boat or information on a vehicle. The display controller switchably displays the multidimensional codes representing identical information by a plurality of display patterns where ease of reading is mutually different.

BRIEF DESCRIPTION OF THE DRAWINGS

FIG. 1 is a perspective view of a boat as an application example of the present invention;

FIG. 2 is a drawing schematically illustrating a relationship between an outboard motor and a display device according to an embodiment;

FIG. 5 is a flowchart showing a process example by the display device according to the embodiment.

DETAILED DESCRIPTION

Figure 3:
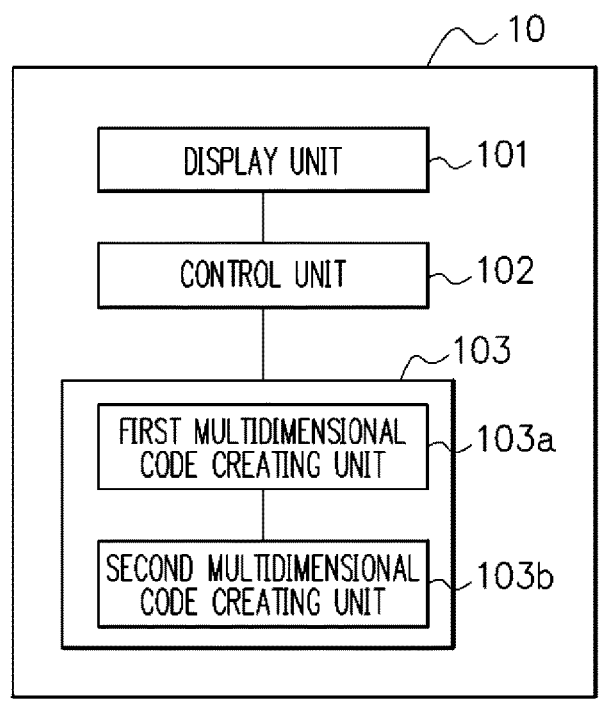
FIG. 3 is a block diagram illustrating a functional configuration example of the display device according to the embodiment.

A display controller according to one embodiment of the present invention is a display controller that displays a multidimensional code in a display device. The multidimensional code represents information on an outboard motor mounted to a boat or information on a vehicle. The display controller switchably displays the multidimensional codes representing identical information by a plurality of display patterns where ease of reading is mutually different. Accordingly, the display controller can appropriately display the multidimensional code according to circumstances of the moment, for example, an environment where the display device is placed and reading performance of the multidimensional code.

The following describes preferred embodiments of the present invention with reference to the attached drawings.

FIG. 1 is a perspective view viewing a boat 1 as an application example of the present invention from obliquely rearward. First, the following describes an outline of an overall configuration of the boat 1 with reference to FIG. 1. Including FIG. 1, the drawings used in the following description each indicate a front and a rear of the vehicle by arrows as necessary.

As illustrated in FIG. 1, a plurality of outboard motors 3 (here, two outboard motors 3A and 3B) to which respective engines are mounted are mounted to transoms, which are positioned at the rear of a boat body 2 of the boat 1, via bracket devices.

A boat navigation room 4 is disposed at the front side of the boat body 2. This boat navigation room 4 includes a steering handle 5, a remote control lever 6, an ignition switch 7, and a similar member. Meanwhile, the outboard motors 3 include Engine Control Modules 8 (ECMs) to which the ignition switch 7 and a similar member are coupled.

A boat operator operates the steering handle 5 and the remote control lever 6 in a normal operation to ensure navigating the boat 1. Then, electrically controlling the outboard motors 3 based on operation information by the steering handle 5 and the remote control lever 6 ensures changing, for example, a shift, a throttle, and a steering of the outboard motor 3.

As illustrated in FIG. 2, the boat 1 includes a battery 11 coupled to, for example, a display device 10 described later as a power source to drive the display device 10 and a similar member. An ignition switch needs to be turned on to supply the power source to the ECM 8 of the outboard motor 3.

Here, the boat navigation room 4 includes the display device 10 at a position where the boat operator can visually perceive the display device 10 for operation, for example, obliquely forward of the steering handle 5 as illustrated in FIG. 1.

The display device 10 is constituted as a multifunctional display device and can display an operating state of the outboard motors 3 and a multidimensional code (for example, a QR code (registered trademark)) representing unique information of the outboard motors 3. As illustrated in FIG. 2, the display device 10 is also coupled to ECM 8 of the outboard motor 3 via a communication line 9 to ensure obtaining the information on the operating state and the unique information of the outboard motor 3. A remaining amount of fuel in fuel tanks 19, which are detected by fuel sensors 20, an angle of trim of the outboard motor 3, which is detected by a trim angle sensor 21, and a similar specification are input to the display device 10.

The display devices 10 are basically installed to each outboard motor 3 and are coupled to the outboard motors 3. While FIG. 2 illustrates a combination of the one outboard motor 3 and the one display device 10, the respective outboard motors 3A and 3B illustrated in FIG. 1 may be coupled similar to the case of FIG. 2. With the use of the display device 10, inputting ID information (such as Number of the outboard motor 3) of the outboard motor 3 on the display device 10 side ensures registration of the ID information of the outboard motor to the display device 10 and the outboard motor 3.

Figure 4A:
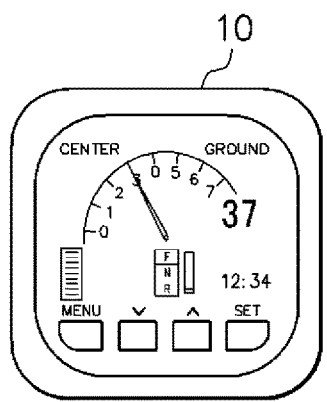
FIG. 4A is a drawing schematically illustrating a display example by the display device.

As illustrated in FIG. 4A, the display device 10 displays an engine speed, a running speed, a fuel consumption, the remaining amount of fuel, and a similar specification of the outboard motor 3 in an analog format or a digital format as the operating state of the outboard motor 3.

Figure 4B:
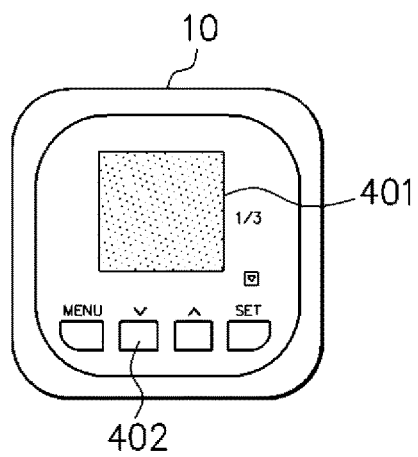
FIG. 4B is a drawing schematically illustrating a display example by the display device.

As illustrated in FIG. 4B, the display device 10 displays information on, for example, an operation history and a past failure history of the outboard motor 3 in the multidimensional code as the unique information of the outboard motor 3. A multidimensional code 401 is displayed with a predetermined size in a screen of the display device 10. The multidimensional code 401 displayed in the display device 10 can be shot by a multidimensional code reader function of a mobile terminal for reading, and the reading result can be displayed in a screen of the mobile terminal and can be transmitted to a mobile terminal and a personal computer at a remote maintenance factory or a similar site by, for example, an e-mail. At the remote maintenance factory or a similar site, a countermeasure against a failure such as a further detailed failure diagnostic and an analysis of a failure cause based on the unique information of the outboard motor as the transmitted reading result of the multidimensional code is possible. The multidimensional code 401 may include information such as ID information of the machine itself (the display device 10), the ID information of the outboard motor 3, and a version of the machine itself (the display device 10) in addition to the unique information of the outboard motor 3.

Whether the operating state is displayed as illustrated in FIG. 4A and whether the multidimensional code 401 is displayed as illustrated in FIG. 4B are switched by a predetermined user operation.

Here, to display the multidimensional code 401, the display device 10 can display the multidimensional codes representing the identical information switchable in a plurality of display patterns where ease of reading is mutually different. Specifically, the unique information of the outboard motor 3 desired to be converted into the multidimensional code can be switchably displayed between a display pattern that represents the unique information by the predetermined count of multidimensional codes and a display pattern that reduces the information volume represented by each of the multidimensional code and represents the unique information by the multidimensional codes where the count of multidimensional codes is larger in count than the predetermined count of multidimensional codes.

FIG. 4B expresses the unique information of the outboard motor 3 by three multidimensional codes. Pressing a switching button 402 in the screen turns the pages of the three multidimensional codes. That is, like the multidimensional code on 1/3, the multidimensional code on 2/3, and the multidimensional code on 3/3, the display can be sequentially switched. These three multidimensional codes have concatenation information. When the multidimensional code reader function of the mobile terminal reads all multidimensional codes, the concatenated one datum is created.

While FIG. 4B expresses the unique information of the outboard motor 3 by the three multidimensional codes, for example, this can be switched to a display pattern that expresses the unique information by five multidimensional codes. For example, by increasing one cell of the multidimensional code, the information volume represented by each of the multidimensional codes is reduced and the count of multidimensional codes is increased. As long as the sizes of the multidimensional codes displayed in the display device 10 are identical, reducing the information volume represented by the multidimensional code ensures facilitating the reading of the multidimensional codes. The points that the pages of the five multidimensional codes are turned and the multidimensional codes have the concatenation information are similar to the case of the three multidimensional codes.

FIG. 3 illustrates a functional configuration of the display device 10.

A display unit 101 such as a liquid crystal display unit is used to display the multidimensional code representing the operating state of the outboard motor 3 and the unique information of the outboard motor 3.

A control unit 102 is used to control the entire display device 10 including the display control of the display unit 101.

A multidimensional code creating unit 103 is used to create the multidimensional code representing the unique information of the outboard motor 3. The multidimensional code creating unit 103 includes a first multidimensional code creating unit 103a and a second multidimensional code creating unit 103b. The first multidimensional code creating unit 103a creates a multidimensional code (hereinafter also referred to as a first multidimensional code) for a display pattern that represents the unique information of the outboard motor 3 by the predetermined count of N (one or plural) multidimensional codes. For example, the three multidimensional codes as described in FIG. 4B are created. The second multidimensional code creating unit 103b creates a multidimensional code (hereinafter also referred to as a second multidimensional code) for a display pattern that represents the unique information of the outboard motor 3 by the multidimensional code by reducing the information volume represented by each of the multidimensional codes and increasing the count of multidimensional codes more than the predetermined number N. For example, the five multidimensional codes described in FIG. 4B are created.

A memory on the outboard motor 3 side basically accumulates the unique information of the outboard motor 3. When the multidimensional code creating unit 103 creates the multidimensional code, the unique information may be obtained from the memory on the outboard motor 3 side. Alternatively, a timing is not limited to a timing of creating the multidimensional code by the multidimensional code creating unit 103, and the display device 10 may obtain the unique information accumulated in the memory on the outboard motor 3 side to accumulate the unique information also in the memory on the display device 10 side. In this case, updating the unique information in the memory on the outboard motor 3 side also updates the memory on the display device 10 side.

The display device 10 is thus configured including, for example, a CPU, a ROM, and a RAM. Execution of a predetermined program by the CPU achieves the control unit 102 and the multidimensional code creating unit 103. While this embodiment describes an exemplary configuration where the display controller applying the present invention is integrally included in the display device 10, the display controller applying the present invention may be configured separately from the display device.

FIG. 5 illustrates a process example by the display device 10 according to the embodiment. This flowchart is executed when the multidimensional code is displayed in the display device 10.

At Step S1, the multidimensional code creating unit 103 converts the unique information of the outboard motor 3 into the multidimensional code under the control by the control unit 102 to create the multidimensional codes of the two patterns. That is, the first multidimensional code creating unit 103a creates the first multidimensional code. The second multidimensional code creating unit 103b creates the second multidimensional code.

The creation of the multidimensional code representing the unique information of the outboard motor 3 requires a certain amount of time. For example, when the multidimensional code of the one pattern is created first and the multidimensional code of another one pattern is created in the case where changing the display pattern is necessary, the time is taken until the display pattern is switched. Therefore, for quick switching of the display pattern, the multidimensional codes are preliminary created by the two patterns and are stored in a memory (not illustrated).

The control unit 102 first displays the first page of the first multidimensional code of the smaller count of multidimensional codes among the multidimensional codes of the two patterns created by the first multidimensional code creating unit 103 in the display unit 101. As described in FIG. 4B, pressing the switching button 402 in the screen ensures turning the page in the first multidimensional code.

At Step S2, the control unit 102 determines whether a predetermined switch condition to switch the display pattern of the multidimensional code is met or not. When the switch condition is met, the process proceeds to Step S3, and when the switch condition is not met, the process proceeds to Step S5.

In this embodiment, the predetermined switch condition is a condition set to a display period of the one multidimensional code. When the operation to turn the page is not performed on a page of the currently displayed first multidimensional code exceeding a certain period, it is determined that the reading of the multidimensional code becomes difficult and the process proceeds to Step S3.

At Step S3, the control unit 102 performs a display prompting the switching of the display pattern of the multidimensional code, for example, a pop-up display such as "Change the display to the easy-to-read display?" and then waits for the user operation. In response to this, when a switch instruction for the display pattern is executed by a predetermined user operation, the process proceeds to Step S4 and when the switch instruction is not executed, the process proceeds to Step S5.

At Step S4, the control unit 102 switches the display pattern of the multidimensional code. After the display unit 101 displays the first page of the second multidimensional code with the larger count of multidimensional codes among the multidimensional codes of the two patterns created by the multidimensional code creating unit 103, the process proceeds to Step S6. Although switching the display to the second multidimensional code increase the count of repetitions of the reading operation as the count of multidimensional codes becomes larger in count than the count of first multidimensional codes, the multidimensional codes can be easily read. In the second multidimensional code as well, pressing the switching button 402 in the screen ensures turning the pages.

At Step S5, the control unit 102 determines whether the end condition is met or not. When the end condition is met, this process is exited and when the end condition is not met, the process returns to Step S2. For example, it is only necessary to set the display of all pages of the first multidimensional code as the end condition. This is because it can be said that the end of the display of all pages means the successful reading of all multidimensional codes. For example, execution of an end instruction by the user operation may be set as the end condition.

At Step S6, the control unit 102 waits until the end condition is met and exits the process when the end condition is met. As the end condition, similar to the conditions described at Step S5, for example, the display of all pages of the second multidimensional code and the execution of the end instruction by the user operation are set as the conditions.

While the user's confirmation is performed at Step S3 in the flowchart in FIG. 5, the display pattern of the multidimensional code may be always switched in the case where the operation to turn the page is not performed on the currently displayed first multidimensional code page exceeding a constant period.

Alternatively, the switching determination of the display pattern may be left for the user and the display pattern of the multidimensional code may be switched by the predetermined user operation.

As described above, the multidimensional code can be appropriately displayed from an aspect of ease of reading and a labor taken for the reading of the multidimensional code according to circumstances of the moment, for example, an environment where the display device 10 is placed and reading performance of the multidimensional code.

The display device installed at the boat is not limited to be dedicated for one outboard motor, and the display device is also applicable as a service tool to display the multidimensional code representing the unique information of another outboard motor. For example, the display device 10 coupled to the outboard motor 3 is once removed and can be coupled to another outboard motor for use as the service tool. It is effective that, while another outboard motor mounted to another boat motor has poor condition near the boat mounting the outboard motor 3 but a display device is not installed to the other outboard motor, the unique information of the other outboard motor is desired to be transmitted to the remote maintenance factory or a similar site. In this case as well, to display the multidimensional code, the display device 10 switchably displays the multidimensional codes representing the identical information in the plurality of display patterns where ease of reading is mutually different.

While the embodiments of the present invention are described in detail with reference to the drawings, the respective embodiments merely describe the concrete examples to embody the present invention. The technical scope of the present invention is not limited to the respective embodiments. The present invention can be variously modified within the scope of not departing from the gist and the modifications are included in the technical scope of the present invention.

For example, while the above-described embodiment creates the multidimensional codes by the two patterns and the unique information of the outboard motor 3 is expressed by the three multidimensional codes and the five multidimensional codes, the count of multidimensional codes is not limited.

With the above-described embodiment, while the multidimensional code displayed in the display device 10 represents the unique information of the outboard motor 3, as long as the information represents the information on the outboard motor mounted to the boat or the information on the vehicle, the specific contents are not limited.

The present invention allows appropriately displaying the multidimensional code according to circumstances of the moment.

What is claimed is:

1. A display controller comprising:
   a controller providing multidimensional code to a display device,
   wherein the controller switchably displays the multidimensional codes representing identical information by a plurality of display patterns where ease of reading is mutually different,
   wherein the multidimensional code represents information regarding an outboard motor mounted to a boat, or information regarding a vehicle, and
   wherein the plurality of display patterns are switchable between a display pattern that represents information desired to be converted into the multidimensional code by a predetermined count of the multidimensional codes and a display pattern that reduces an information volume represented by each of the multidimensional codes and represents the information by the multidimensional codes larger in count than the predetermined count of multidimensional codes.

2. A display controller comprising:
   a controller providing multidimensional code to a display device,
   wherein the controller switchably displays the multidimensional codes representing identical information by a plurality of display patterns where ease of reading is mutually different,
   wherein the multidimensional code represents information regarding an outboard motor mounted to a boat, or information regarding a vehicle, and
   a unit configured to switch the display pattern of the multidimensional code in accordance with a predetermined switch condition or prompt the switching of the display pattern of the multidimensional code.

3. The display controller according to claim 1, further comprising
   a unit configured to switch the display pattern of the multidimensional code in accordance with a predetermined switch condition or prompt the switching of the display pattern of the multidimensional code.

4. The display controller according to claim 2, wherein the predetermined switch condition is a condition set to a display period of one multidimensional code.

5. The display controller according to claim 3, wherein the predetermined switch condition is a condition set to a display period of one multidimensional code.

6. The display controller according to claim 1, further comprising
   a unit configured to switch the display pattern of the multidimensional code by a predetermined user operation.

* * * * *